(12) United States Patent
Egi

(10) Patent No.: US 11,012,012 B2
(45) Date of Patent: May 18, 2021

(54) SYNCHRONIZATION CONTROL DEVICE

(71) Applicant: OMRON Corporation, Kyoto (JP)

(72) Inventor: Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/643,873

(22) PCT Filed: Nov. 27, 2018

(86) PCT No.: PCT/JP2018/043585
§ 371 (c)(1),
(2) Date: Mar. 3, 2020

(87) PCT Pub. No.: WO2019/123998
PCT Pub. Date: Jun. 27, 2019

(65) Prior Publication Data
US 2020/0403538 A1     Dec. 24, 2020

(30) Foreign Application Priority Data

Dec. 18, 2017   (JP) .............................. JP2017-241964

(51) Int. Cl.
*H02P 5/60*   (2006.01)
*G05D 3/12*   (2006.01)

(52) U.S. Cl.
CPC ............... *H02P 5/60* (2013.01); *G05D 3/122* (2013.01)

(58) Field of Classification Search
CPC ... G05D 3/122; H02P 5/60; H02P 1/00; H02P 1/04; H02P 1/026; H02P 1/24; H02P 1/18;
(Continued)

(56) References Cited

U.S. PATENT DOCUMENTS 6,714,842 B1    3/2004  Ito
8,214,063 B2 *  7/2012  Ellis ..................... G05B 13/042
                                                        700/36
(Continued)

FOREIGN PATENT DOCUMENTS

JP    2000-339032 A    12/2000
JP    2006-302201 A    11/2006
(Continued)

OTHER PUBLICATIONS

English translation of the International Search Report("ISR") of PCT/JP2018/043585 dated Mar. 5, 2019.
(Continued)

*Primary Examiner* — Antony M Paul
(74) *Attorney, Agent, or Firm* — Metrolex IP Law Group, PLLC

(57) ABSTRACT

Provided is a synchronization control device that can control a mechanical system with good track followability. A control unit for each shaft of the synchronization control device includes: a delay time compensator which delays a position command to an FB torque command generation unit, and of which equivalent time constant is approximately the same as an equivalent time constant as a gain compensator. The synchronization control device also includes a phase adjustment unit, which adjusts a phase of at least one of the position commands, in a previous stage of each control unit, so that the time until the position command, input to each control unit, is output from the delay time compensator, becomes approximately the same.

7 Claims, 14 Drawing Sheets

(58) Field of Classification Search
CPC ...... H02P 1/26; H02P 1/46; H02P 1/50; H02P 1/54; H02P 1/465; H02P 3/00; H02P 5/00; H02P 5/46; H02P 5/56; H02P 6/00; H02P 6/04; H02P 6/08; H02P 7/00; H02P 21/00; H02P 21/003; H02P 21/16; H02P 21/20; H02P 21/30; H02P 23/00; H02P 23/24; H02P 23/12; H02P 25/00; H02P 25/022; H02P 27/00; H02P 27/04; H02P 27/06

See application file for complete search history.

(56) References Cited

U.S. PATENT DOCUMENTS

| | | | |
|---|---|---|---|
| 9,772,619 B2 * | 9/2017 | Shinohara | ................ H02P 5/46 |
| 2001/0002097 A1 | 5/2001 | Tsutsui | |

FOREIGN PATENT DOCUMENTS

| | | |
|---|---|---|
| JP | 2013-037448 A | 2/2013 |
| JP | 2016-212923 A | 12/2016 |
| WO | 2000/70739 A1 | 11/2000 |

OTHER PUBLICATIONS

English translation of the Written Opinion("WO") of PCT/JP2018/043585 dated Mar. 5, 2019.

\* cited by examiner

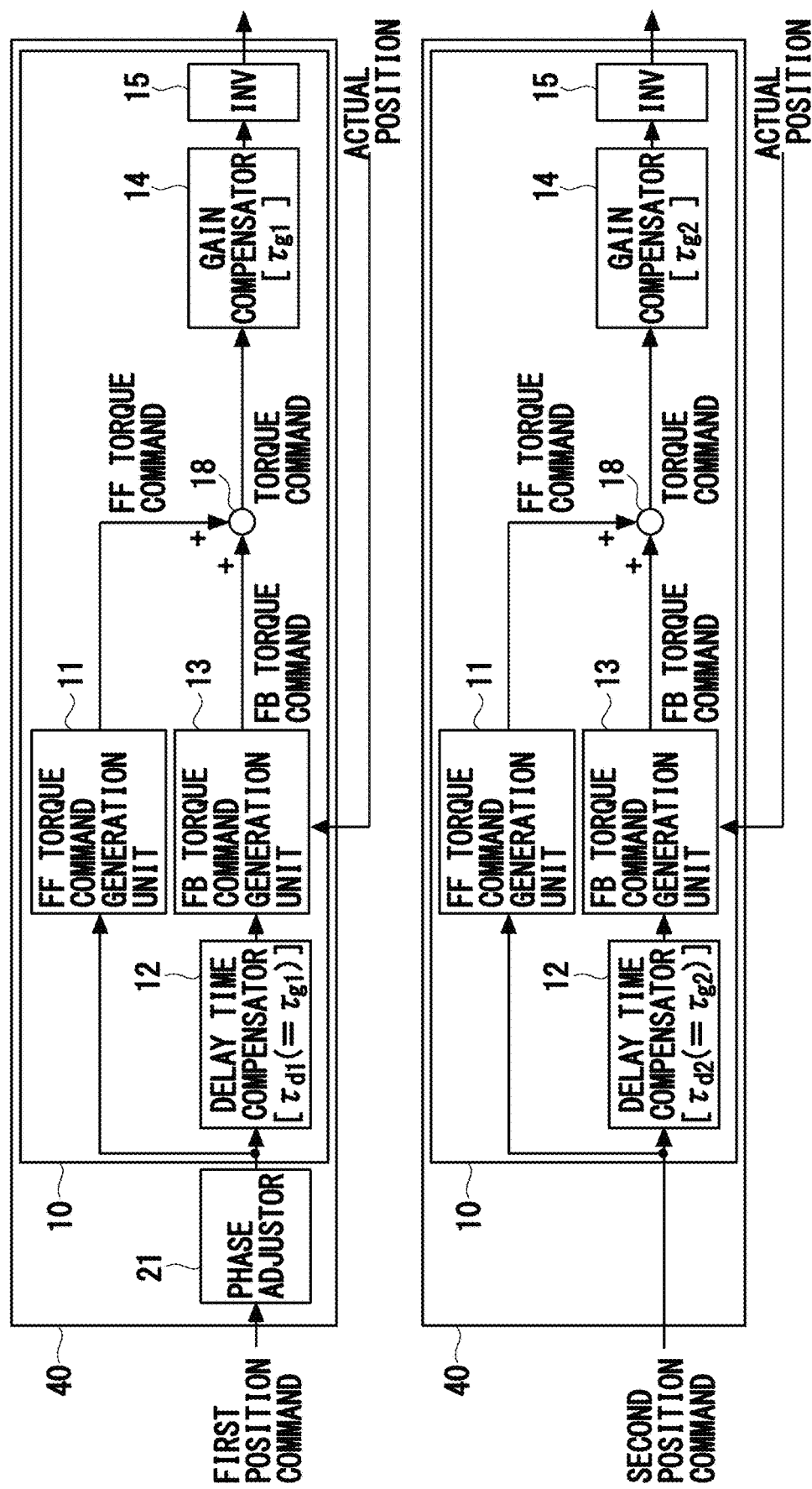

SYNCHRONIZATION CONTROL DEVICE

TECHNICAL FIELD

The present invention relates to a synchronization control device that performs synchronization control of two or more shafts.

BACKGROUND ART

A known synchronization control device that performs synchronization control of two or more shafts is a device that includes, for each shaft, a control unit that generates a torque command by generating and adding a feed forward (FF) torque command and a feed back (FB) torque command, and processes the generated torque command using a gain compensator (e.g. notch filter), and controls a motor in accordance with the processed torque command.

The control unit that is used for controlling each shaft in the synchronization control device having the above configuration includes, a gain compensator, which has a characteristic in accordance with the characteristic of the mechanical load (e.g. resonance frequency) of each shaft. Therefore, in the synchronization control device having the above configuration, a synchronous deviation may occur due to the difference in a characteristic of the gain compensator for each shaft, but a technique to suppress this synchronous deviation has not yet been developed (e.g. see PTL 1 and 2).

CITATION LIST

Patent Literature

PTL 1: Japanese Patent Application Publication No. 2016-212923
PTL 2: Japanese Patent Application Publication No. 2000-339032

SUMMARY OF INVENTION

Technical Problem

With the foregoing in view, it is an object of the present invention to provide a synchronization control device that includes, for each shaft, a control unit that generates a torque information by generating and adding an FF torque command and an FB torque command, and processes the generated torque command using a gain compensator, so as to control the mechanical system with good track followability.

Solution to Problem

To achieve the above object, a synchronization control device according to an aspect of the present invention that controls a first motor and a second motor includes: an adjustment unit where a first position command, which is a position command for the first motor, and a second position command, which is a position command for the second motor, are to be input, and at least one of a phase of the first position command which were input and a phase of the second position command which were input, is adjusted; a first feed forward (FF) torque command generation unit that generates a first FF torque command on the basis of the first position command which is input via the adjustment unit; a first delay time compensator that filters the first position command which is input via the adjustment unit; a first feed back (FB) torque command generation unit that generates a first FB torque command on the basis of the first position command which passed through the first delay time compensator, and a measurement result of an index value of a position of the first motor or a position of a mechanical load driven by the first motor; a first gain compensator that filters a first torque command acquired by adding the first FF torque command and the first FB torque command; and a first motor control unit that controls the first motor in accordance with the first torque command which passed through the first gain compensator. The synchronization control device also includes: a second FF torque command generation unit that generates a second FF torque command on the basis of the second position command which is input via the adjustment unit; a second delay time compensator that filters the second position command which is input via the adjustment unit; a second FB torque command generation unit that generates a second FB torque command on the basis of the second position command which passed through the second delay time compensator, and a measurement result of an index value of a position of the second motor or a position of a mechanical load driven by the second motor; a second gain compensator that filters a second torque command acquired by adding the second FF torque command and the second FB torque command; and a second motor control unit that controls the second motor in accordance with the second torque command which passed through the second gain compensator. The first delay time compensator of the synchronization control device has an equivalent time constant which is in accordance with an equivalent time constant of the first gain compensator, the second delay time compensator has an equivalent time constant which is in accordance with an equivalent time constant of the second gain compensator, and the adjustment unit adjusts at least one of the phase of the first position command and the phase of the second position command such that the difference between a time until the input first position command is output from the first delay time compensator, and a time until the input second position command is output from the second delay time compensator becomes smaller.

In other words, the synchronization control device according to an aspect of the present invention has a configuration where the position command and the index value of the position of the motor/load are input to the FB torque command generation unit for each motor with similar delay. The synchronization control device also includes an adjustment unit that adjusts at least one of the phase of the first position command and the phase of the second position command, so that the difference between a time until the input first position command is output from the first delay time compensator, and a time until the input second command is output from the second delay time compensator, decreases. Therefore, according to this synchronization control device, a synchronous deviation, due to a difference in a characteristic of the gain compensator for each shaft, can be suppressed, whereby the mechanical system (two shafts) can be controlled with good track followability.

Each position command (first and second position commands) that is input to the adjustment unit of the synchronization control device may be information which is input from an external device, or information which is generated in the synchronization control device. Further, the index value of the position of each motor/load may be information which directly indicates the position of each motor/load, or may be information which indirectly indicates the position of each motor/load (e.g. velocity of motor/load).

The first delay time compensator may have an equivalent time constant that is the same as the equivalent time constant of the first gain compensator, and the second delay time compensator may have an equivalent time constant that is the same as the equivalent time constant of the second gain compensator. The adjustment unit may adjust at least one of the phase of the first position command and the phase of the second position command, so that the difference between a time until the input first position command is output from the first delay time compensator, and a time until the input second position command is output from the second delay time compensator, becomes "0".

The synchronization control device may use a configuration where "the equivalent time constant of the second delay time compensator is larger than the equivalent time constant of the first delay time compensator, and the adjustment unit adjusts the phase of the second position command without adjusting the phase of the first position command". The adjustment unit may be constituted of an all-pass filter that adjusts the phase of the second position command, or may be constituted of a first all-pass filter which adjusts the phase of the first position command, and a second all-pass filter which adjusts the phase of the second position command.

The n-th (n=1, 2) delay time compensator may be a low-pass filter or an all-pass filter if the delay time compensator (filter) has an equivalent time constant in accordance with the equivalent time constant of the n-th gain compensator. Needless to say, the n-th (n=1, 2) delay time compensator may be the same filter as the n-th gain compensator.

Advantageous Effects of Invention

According to the present invention, a synchronization control device that can control the mechanical system with good track followability can be provided.

BRIEF DESCRIPTION OF DRAWINGS

FIG. 3D is a diagram depicting a hardware configuration example of the synchronization control device.

DESCRIPTION OF EMBODIMENTS

Application Example

An application example of the present invention will be described first.

Figure 1:
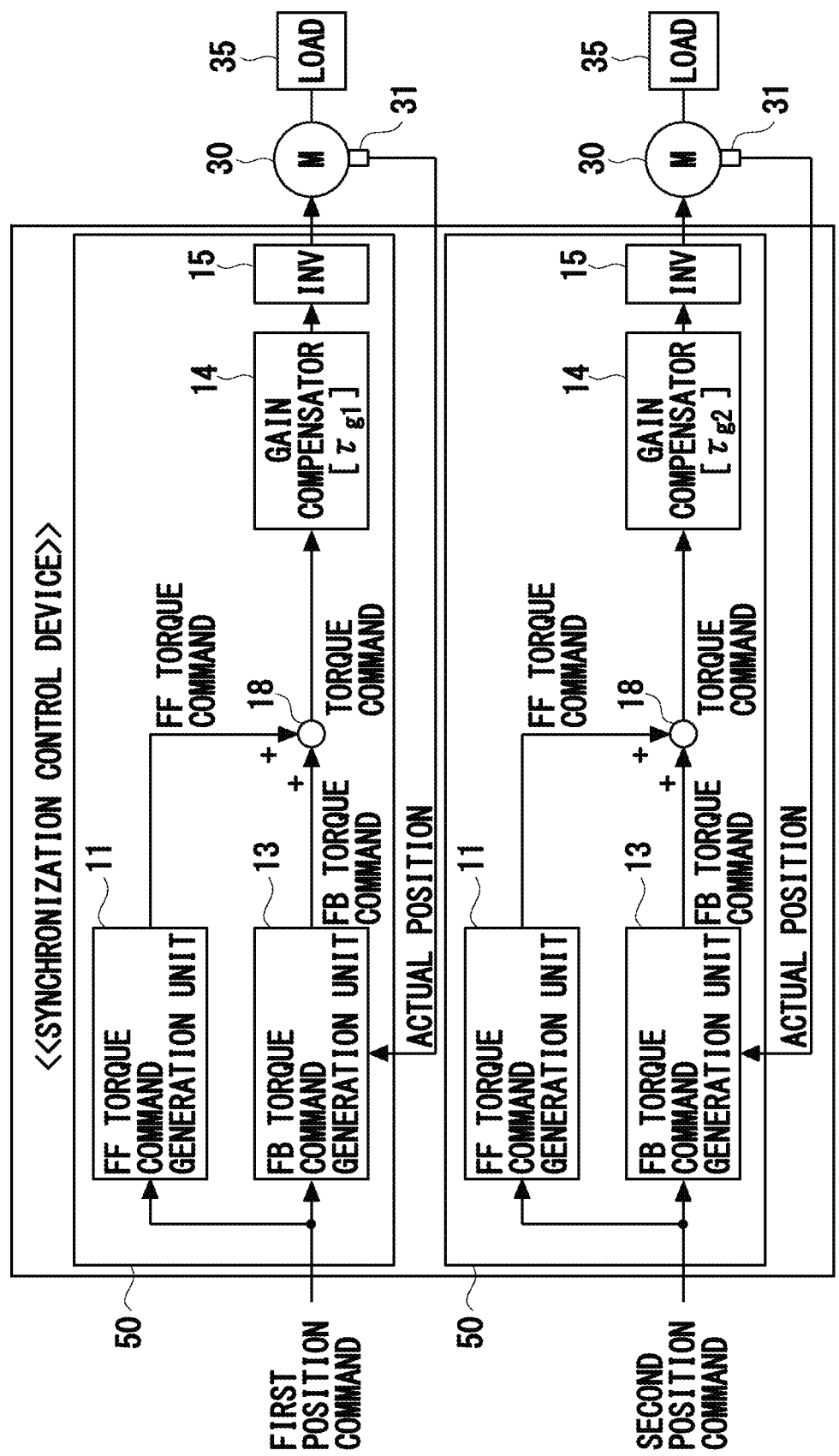
FIG. 1 is a diagram depicting a configuration of a synchronization control device to which the present invention is applied.

The present invention is applied to a synchronization control device having a configuration illustrated in FIG. 1.

This synchronization control device is a device that synchronously controls two shafts (two motors 30 to which a load 35 is connected). The synchronization control device includes a control unit 50 which controls a first motor 30 on the basis of a first position command, and a control unit 50 which controls a second motor 30 on the basis of a second position command. In FIG. 1, each position command is input to the control unit 50 from outside the synchronization control device, but each position command may be generated within the synchronization control device. Hereafter a control unit 50, that controls an n-th motor 30 on the basis of an n-th (n=1, 2) position command, is called an n-th control unit 50. Further, each unit (e.g. FF torque command generation unit 11) in the n-th control unit 50 is called an n-th unit (e.g. first FF torque command generation unit 11).

An n-th (n=1, 2) FF torque command generation unit 11 is a unit (functional block) that generates a feed forward (FF) torque on the basis of the n-th position command. An n-th FB torque command generation unit 13 is a unit that generates a feed back (FB) torque command which compensates excess or deficiency of the FF torque command on the basis of the difference between the actual position of the n-th motor 30, which is detected by a position detector 31 installed in the n-th motor 30, and the n-th position command. The information that is input to each FB torque command generation unit 13 from the motor 30 side may be a measurement result of information by which the position of the motor 30 or the position of a load (mechanical load) 35 can be detected. Therefore, the information that is input to the FB torque command generation unit 13 from the motor 30 side may be a measurement result of the velocity of the motor 30, the position of the load 35, the velocity of the load 35 or the like.

Each gain compensator 14, to which a result of adding the FF torque command and the FB torque command by an adder 18 (hereafter called a torque command) is input, is a digital filter to decay a signal in a specific frequency band (e.g. notch filter, torque filter). Each inverter unit (INV) 15 is a unit constituted of an inverter that generates current which is supplied to the motor 30, and a pulse width modulation (PWM) control unit which PWM-controls the inverter in accordance with a torque command supplied by the gain compensator 14.

In the case of controlling the motor 30 by the control unit 50 having the above mentioned configuration, transfer of the torque command to the inverter unit 15 is delayed by a gain compensator 14. Hence, the transfer of the actual position also delays accordingly, but the position command, by which the difference from the actual position is calculated, is not delayed in the FB torque command generation unit 13. Therefore, the FB torque command generated by the FB torque command generation unit 13 of the control unit 50 includes an error generated by the difference of delay times between the transfer of the position command and that of the actual position.

The delay time of the actual position is in accordance with the equivalent time constant of the gain compensator 14. The characteristic of the gain compensator 14, however, is determined in accordance with the resonance frequency and the like of the load 35, hence the equivalent time constant of the gain compensator 14 in each control unit 50 is normally different. Hence in the case of the synchronization control device having the configuration illustrated in FIG. 1, the difference of the delay time of the FB torque command is generated in each shaft due to the difference of the characteristic of the gain compensator 14 in the control unit 50 for each shaft, and as a result, in some cases, sufficient track followability may not be acquired.

Figure 2:
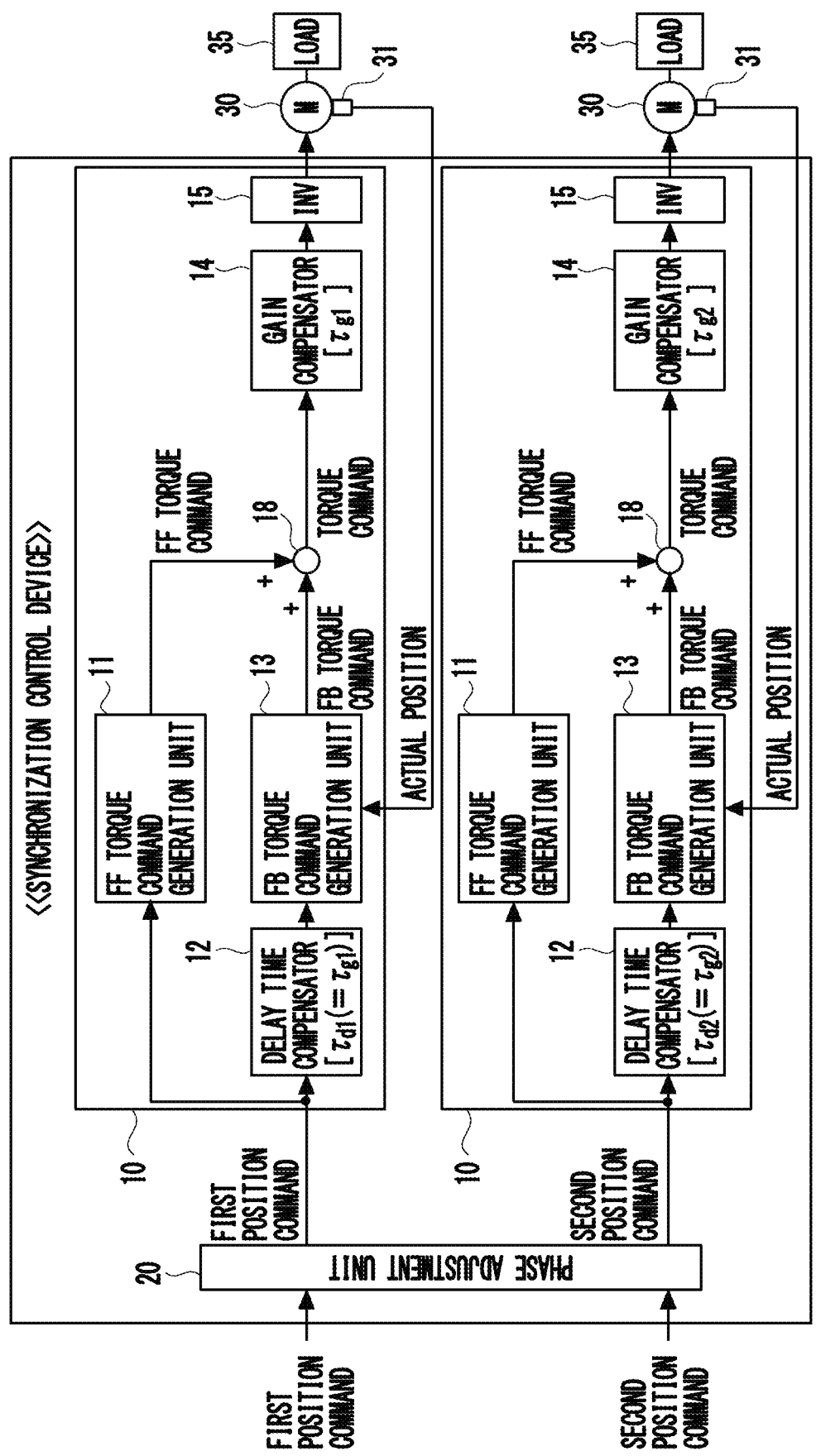
FIG. 2 is a diagram depicting an application example of the present invention.

Therefore in order to improve the track followability of the above mentioned type of synchronization control device, the present invention uses the configuration illustrated in FIG. 2. In the following description as well, a control unit 10, to which the n-th (n=1, 2) position command is input, is called the n-th control unit 10, and each unit of the n-th control unit 10 is called the n-th unit, just like the description on FIG. 1.

The n-th (n=1, 2) control unit 10 of the synchronization control device (FIG. 2) is a modified unit of the n-th control unit 50, so that a n-th position command is input to the n-th FB torque command generation unit 13 via the n-th delay time compensator 12. The n-th delay time compensator 12 is a filter (e.g. notch filter, low-pass filter, all-pass filter) having an equivalent time constant $\tau_{dn}$ in accordance with an equivalent time constant $\tau_{gn}$ of the n-th gain compensator 14. For the n-th delay time compensator 12, a filter, of which equivalent time constant $\tau_{dn}$ matches with the equivalent time constant $\tau_{gn}$ of the n-th gain compensator 14, is normally used. However, the equivalent time constant $\tau_{dn}$ need not match with the equivalent time constant $\tau_{gn}$. The equivalent time constant $\tau_{gn}$ may be a value close to the equivalent time constant $\tau_{dn}$ (e.g. 80 to 120% of the equivalent time constant $\tau_{dn}$).

Figure 3A:
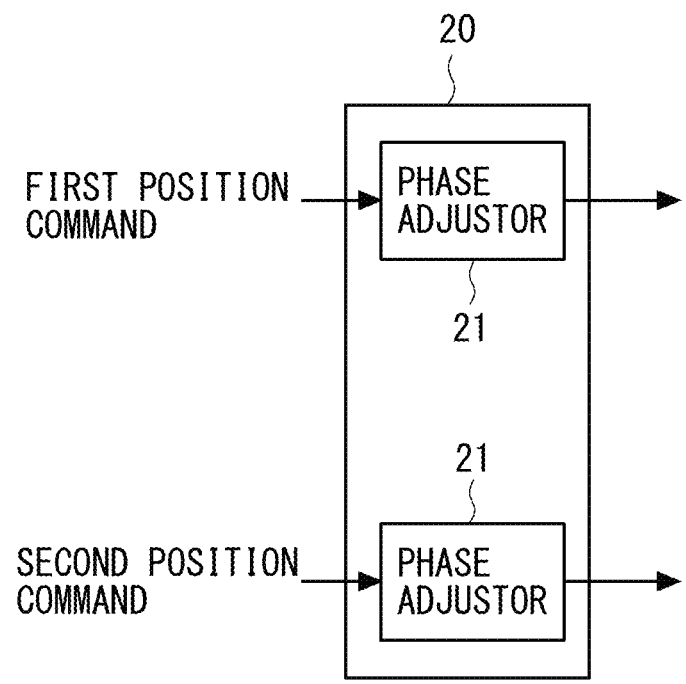
FIG. 3A is a diagram depicting a configuration example of a phase adjustment unit.
Figure 3B:
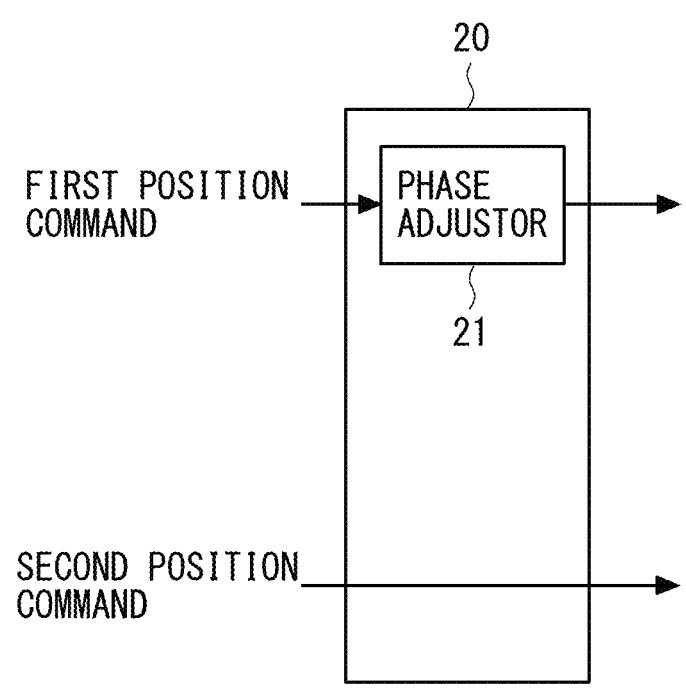
FIG. 3B is a diagram depicting a configuration example of a phase adjustment unit.

A phase adjustment unit 20, which is disposed in the previous stage of the two control units 10, is a unit that adjusts at least one of the phase of the first position command and the phase of the second position command, so that the time difference between the time until the first position command is output from the first delay time compensator 12 and the time until the second position command is output from the second delay time compensator 12 becomes smaller than that in the case of not adjusting the phases of these position commands. This phase adjustment unit 20 may be any unit, as long as the above mentioned time difference can be decreased. Therefore, as illustrated in FIG. 3A, the phase adjustment unit 20 may be a unit constituted of a phase adjustor 21 which adjusts a phase of the first position command (hereafter called the first phase adjustor 21), and a phase adjustor 21 which adjusts a phase of the second position command (hereafter called the second phase adjustor 21). Further, as illustrated in FIG. 3B, the phase adjustment unit 20 may be a unit constituted of only the phase adjustor 21 which adjusts the phase of only one of the position commands (first position command in FIG. 3B).

Figure 3C:
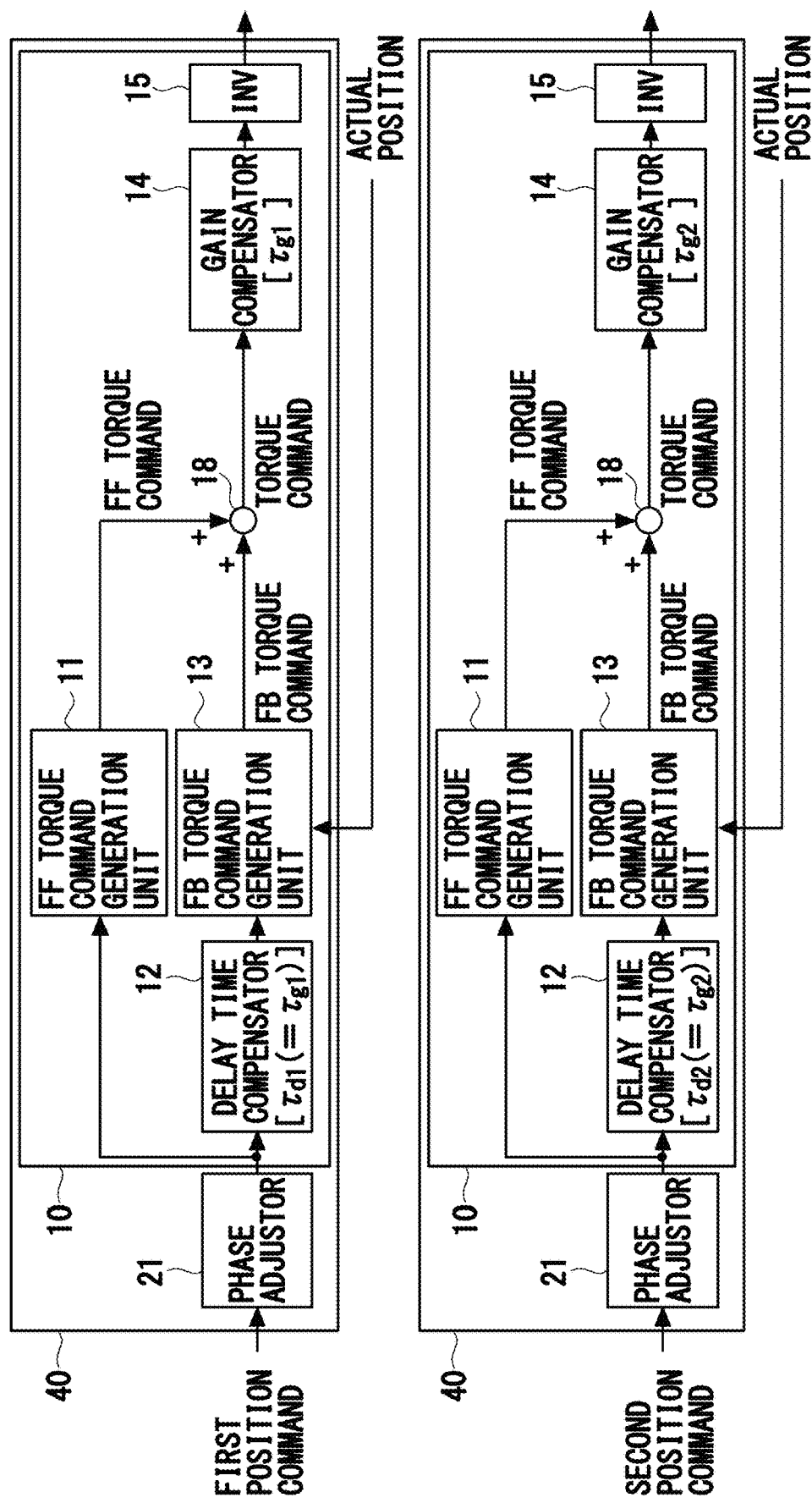
FIG. 3C is a diagram depicting a hardware configuration example of the synchronization control device.

The hardware configuration of the synchronization control device is not especially limited. For example, as illustrated in FIG. 3C and FIG. 3D, the synchronization control device may be constituted of two servo drivers 40 for single shaft control.

The present invention will be concretely described on the basis of embodiments. In each embodiment to be described herein below as well, a control unit, to which the n-th position command is input, is called the n-th control unit, and each unit in the n-th control unit is called the n-th unit.

Embodiment 1

Figure 4:
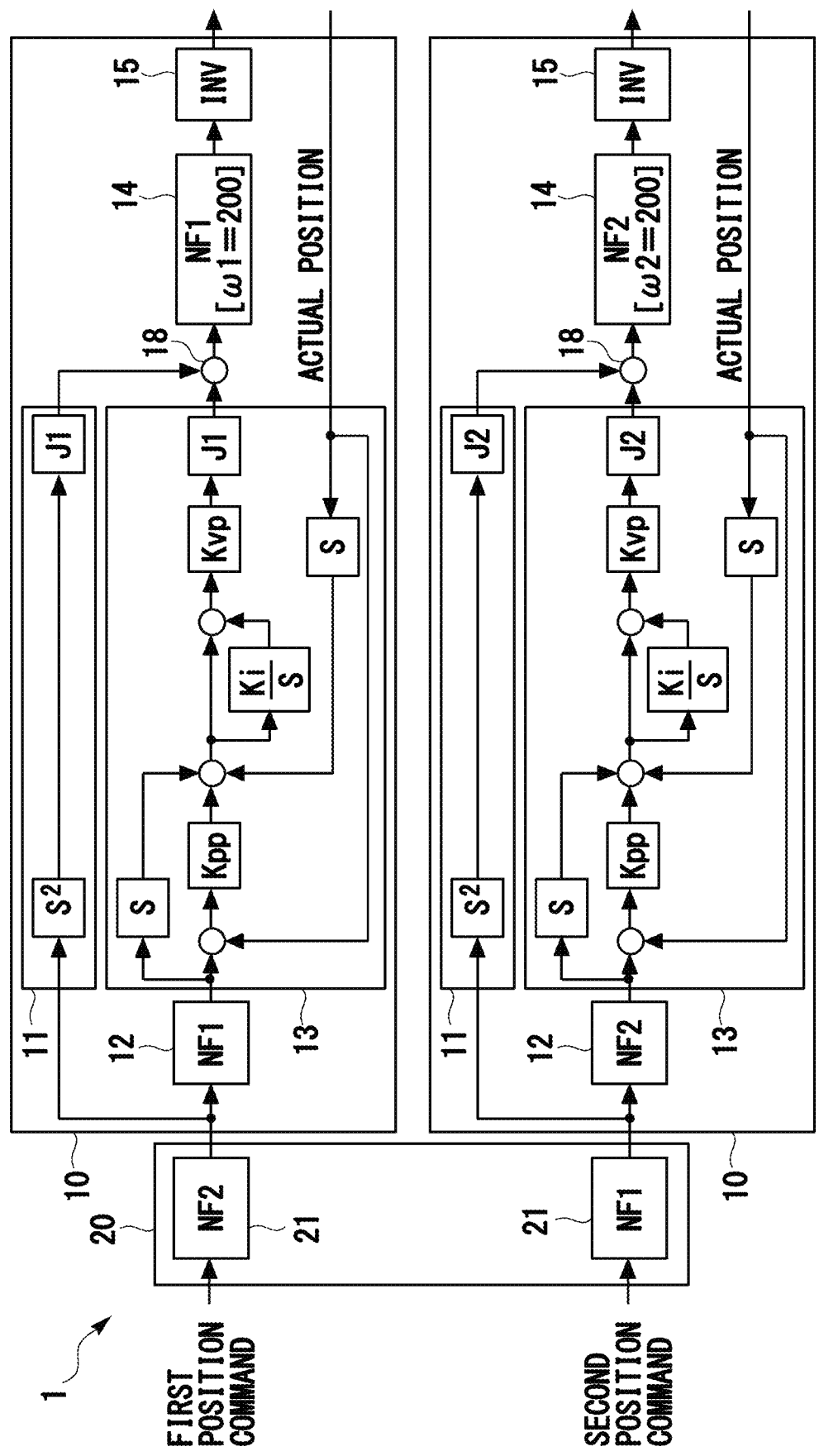
FIG. 4 is a schematic block diagram depicting a synchronization control device according to Embodiment 1 of the present invention.

FIG. 4 indicates a general configuration of a synchronization control device 1 according to Embodiment 1 of the present invention. The configurations of the FF torque command generation unit 11 and the FB torque command generation unit 13 illustrated in FIG. 4 are commonly used. Hence, a detailed description on each command generation unit is omitted. J1 and J2 indicate the inertia of the mechanical system (motor 30 and load 35), Kpp indicates a position loop gain, Kvp indicates a velocity loop gain, Ki indicates an integration gain, and s is a Laplace operator.

As illustrated in FIG. 4, the synchronization control device 1 according to Embodiment 1 is a device where the first gain compensator 14 is a notch filter NF1 of which central frequency $\omega_1$ is 200 Hz, and the second gain compensator 14 is a notch filter NF2 of which central frequency $\omega_2$ is 1000 Hz. Hereafter the equivalent time constant of the notch filter $NF_n$ (n=1, 2) is written as $\tau_{nfn}$.

In the synchronization control device 1, a notch filter NF1 and a notch filter NF2 are used for the first delay time compensator 12 and the second delay time compensator 12 respectively. In other words, the synchronization control device 1 has a configuration where the equivalent time constant $\tau_{d1}$ ($=\tau_{nf1}$) of the first delay time compensator 12 matches with the equivalent time constant $\tau_{g1}$ ($=\tau_{nf1}$) of the first gain compensator 14, and the equivalent time constant $\tau_{d2}$ ($=\tau_{nf2}$) of the second delay time compensator 12 matches with the equivalent time constant $\tau_{g2}$ ($=\tau_{nf2}$) of the second gain compensator 14.

The phase adjustment unit 20 of the synchronization control device 1 includes a notch filter NF2 and a notch filter NF1 for the first phase adjustor 21 and the second phase adjustor 21 respectively. The phase adjustment unit 20 also includes a low-pass filter LPF2, of which equivalent time constant $\tau_{p2}$ is the same as the equivalent time constant $\tau_{nf1}$ of the notch filter NF1, for the second phase adjustor 21.

When the first phase adjustor 21 is the notch filter NF2, the total of equivalent time constants of the filters (first phase adjustor 21, first delay time compensator 12), through which the first position command passes before reaching the first FB torque command generation unit 13, is "$\tau_{nf2}+\tau_{nf1}$". When the second phase adjustor 21 is the notch filter NF1, the total of equivalent time constants of the filters (second phase adjustor 21, second delay time compensator 12) through which the second position command passes before reaching the second FB torque command generation unit 13, is "$\tau_{nf1}+\tau_{nf2}$". Therefore, according to the phase adjustment unit 20 having the above configuration, the time difference between the time until the first position command is output from the first delay time compensator 12, and the time until the second position command is output from the second delay time compensator 12, can be decreased, compared with the case of not including the phase adjustment unit 20.

Further, in the synchronization control device 1, the equivalent time constant $\tau_{d1}$ of the first delay time compensator 12 matches with the equivalent time constant $\tau_{g1}$ of the first gain compensator 14, and the equivalent time constant $\tau_{d2}$ of the second delay time compensator 12 matches with the equivalent time constant $\tau_{g2}$ of the second gain compensator 14, as mentioned above. Therefore, according to the synchronization control device 1, the two motors 30 can be well controlled.

Figure 5A:
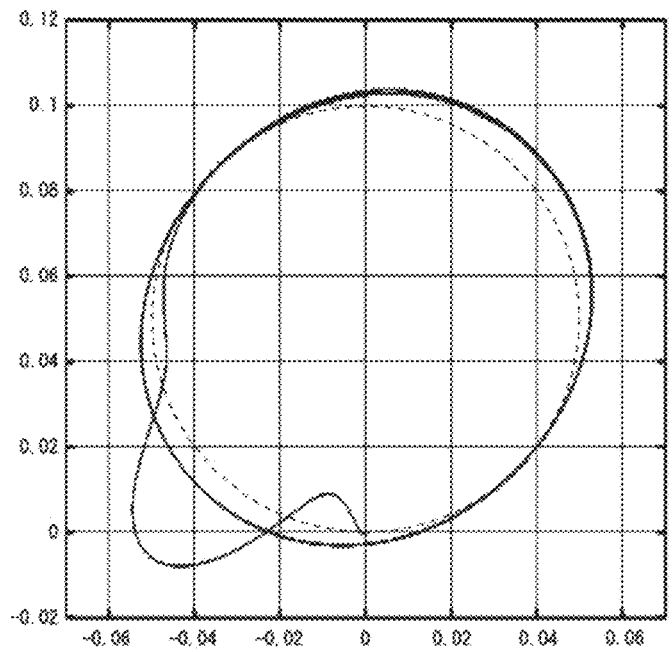
FIG. 5A is a diagram depicting an actual track that is acquired using a non-compensated device.
Figure 5B:
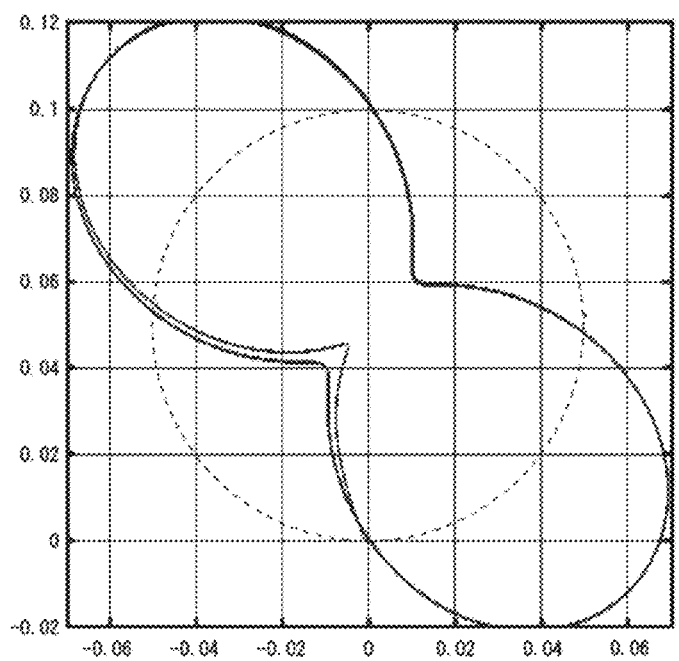
FIG. 5B is a diagram depicting an actual track that is acquired using a phase non-compensated device.
Figure 5C:
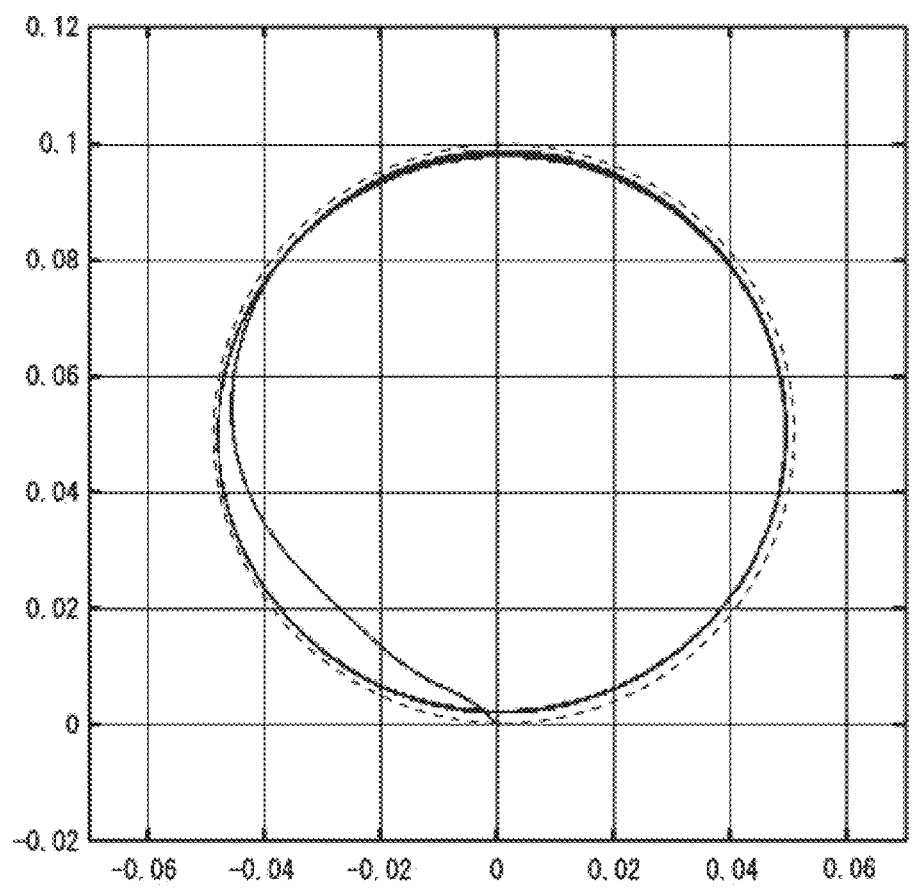
FIG. 5C is a diagram depicting an actual track that is acquired using the synchronization control device according to Embodiment 1.

As a concrete example, FIG. 5A indicates a simulation result of an actual track when a mechanical system (two sets of motor 30 and load 35), which can cause a specific control target member to perform a circular motion, is controlled by "the synchronization control device 1 from which the first and second delay time compensators 12 and the phase adjustment unit 20 are eliminated" (hereafter called the non-compensation device). FIG. 5B and FIG. 5C indicates the simulation results of an actual track when the above mentioned mechanical system is controlled by "the synchronization control device 1 from which the phase adjustment unit 20 is eliminated" (hereafter called the "phase non-compensated device), and by the synchronization control device 1 respectively.

The simulation results in FIG. 5A to FIG. 5C all indicate results when the control target member performed circular motion (diameter is 0.05 [m] and velocity is 10 [cycles/s]) twice. The start position of this circular motion is a point of coordinates (0, 0) in each diagram, and the rotation direction of the circular motion is clockwise. Each actual track in FIG. 5A to FIG. 5C is indicated by magnifying an error from the target track (dotted line) 20 times. The transfer function $NF_1$ of the notch filter NF1 and the transfer function $NF_2$ of the notch filter NF2 used for the simulation are as follows.

$$NF_1 = \frac{s^2 + 2d_1\zeta_1\omega_1 s + \omega_1^2}{s^2 + 2\zeta_1\omega_1 s + \omega_1^2}$$ [Math. 1]

$$NF_2 = \frac{s^2 + 2d_2\zeta_2\omega_2 s + \omega_2^2}{s^2 + 2\zeta_2\omega_2 s + \omega_2^2}$$

In these transfer functions, $d_n$ (n=1, 2), $\zeta_n$ and $\omega_n$ are the notch depth, decay constant and central frequency of the notch filter $NF_n$ respectively.

As indicated in FIG. 5A, if the mechanical system is controlled using the non-compensation device, the actual track is inclined diagonally, since the central frequency $\omega_1$ of the notch filter NF1 (first gain compensator 14) and the central frequency $\omega_2$ of the notch filter NF2 (second gain compensator 14) are different. Further, a relatively large hunting is generated immediately after control is started, since the influence of the notch filter NF1 on the actual position (torque command) and the influence of the notch filter NF2 on the actual position are different.

In the case of the phase non-compensated device (the synchronization control device 1 from which the phase adjustment unit 20 is eliminated), the n-th (n=1, 2) position command is processed by the notch filter $NF_n$ (the n-th delay time compensator 12) that is the same as the notch filter $NF_n$ which processes the n-th torque command (n-th gain compensator). Therefore, if the mechanical system is controlled using the phase non-compensated device, the track reproducibility improves, as indicated in FIG. 5B. However, the amount of error increases since the first and second delay time compensators 12 are disposed.

The synchronization control device 1, on the other hand, includes the phase adjustment unit 20 having the above configuration. Therefore, if the mechanical system is controlled using the synchronization control device 1, the mechanical system can be controlled without a major inclination of the actual track and increase in the amount of error, as indicated in FIG. 5C.

Embodiment 2

Figure 6:
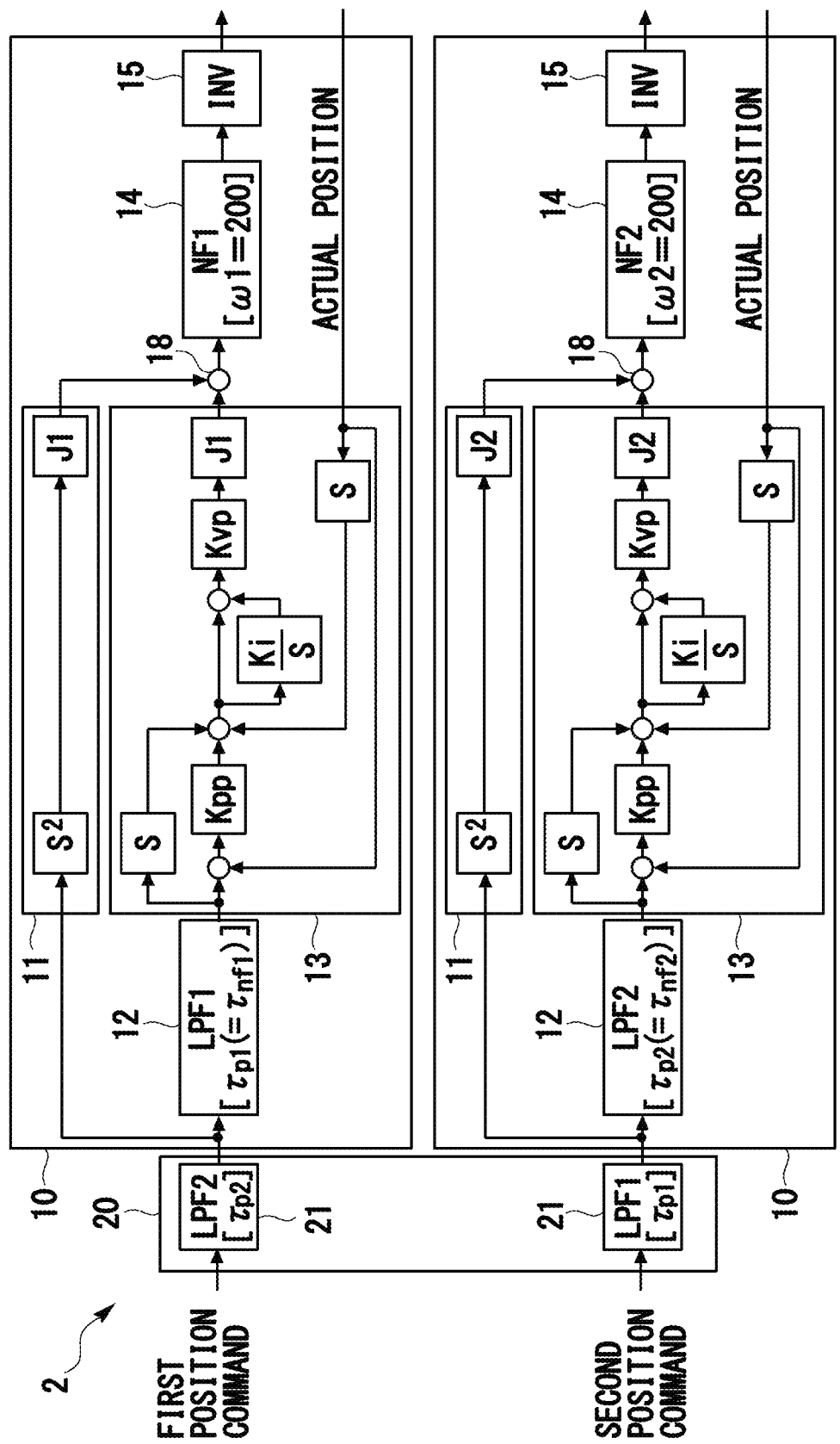
FIG. 6 is a schematic block diagram depicting a synchronization control device according to Embodiment 2 of the present invention.

FIG. 6 indicates a general configuration of a synchronization control device 2 according to Embodiment 2 of the present invention.

As illustrated in FIG. 6, the synchronization control device 2 according to Embodiment 2 is a device where a notch filter NF1, of which central frequency $\omega_1$ is 200 Hz, is used for the first gain compensator 14, and a notch filter NF2, of which central frequency $\omega_2$ is 1,000 Hz, is used for the second gain compensator 14, as in the case of the synchronization control device 1.

In the synchronization control device 2, however, not the notch filter NF1 but a low-pass filter LPF1, of which equivalent time constant $\tau_{p1}$ is the same as the equivalent time constant $T_{nf1}$ of the notch filter NF1 (first gain compensator 14), is used for the first delay time compensator 12. Further, in the synchronization control device 2, not the notch filter NF2 but a low-pass filter LPF2, of which equivalent time constant $\tau_{p2}$ is the same as the equivalent time constant $\tau_{nf2}$ of the notch filter NF2 (second gain compensator 14), is used for the second delay time compensator 12. The phase adjustment unit 20 of the synchronization control device 2 includes a low-pass filter LPF2 and a low-pass filter LPF1 as the first phase adjustor 21 and the second phase adjustor 21 respectively.

This synchronization control device 2 as well, just like the synchronization control device 1, has a configuration where the equivalent time constant $\tau_{d1}$ ($=\tau_{p1}=\tau_{nf1}$) of the first delay time compensator 12 matches with the equivalent time constant $\tau_{g1}$ ($=\tau_{nf1}$) of the first gain compensator 14, and the equivalent time constant $T_{d2}$ ($=T_{p2}=T_{nf2}$) of the second delay time compensator 12 matches with the equivalent time constant $\tau_{g2}$ ($=\tau_{nf1}$) of the second gain compensator 14. In the synchronization control device 2, just like the synchronization control device 1, the total of the equivalent time constants of the first phase adjustor 21 and the first delay time compensator 12 matches with the total of the equivalent time constants of the second phase adjustor 21 and the second delay time compensator 12.

Figure 7:
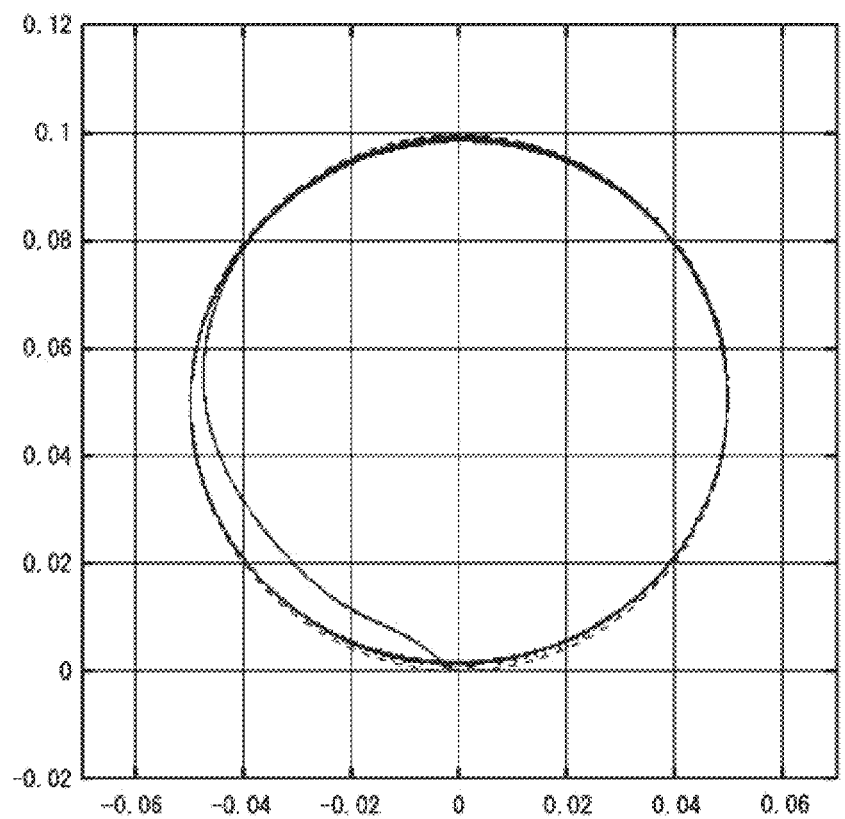
FIG. 7 is a diagram depicting an actual track that is acquired using the synchronization control device according to Embodiment 2.

Therefore according to the synchronization control device 2, synchronization of the two shafts can be controlled well, as indicated in FIG. 7, just like the synchronization control device 1.

The actual track in FIG. 7 is an actual track acquired by simulation that is performed under the same simulation conditions of the actual track in FIG. 5C, and is indicated by magnifying an error from the target track (dotted line) 20 times. The transfer functions of the notch filters NF1 and NF2 used for simulation are $NF_1$ and $NF_2$, as mentioned above, and the transfer functions of the low-pass filters LPF1 and LPF2 used for simulation are the following $LPF_1$ and $LPF_2$ respectively.

$$LPF_1 = \frac{1}{\tau_{nf1}s + 1}$$ [Math. 2]

$$LPF_2 = \frac{1}{\tau_{nf2}s + 1}$$

As indicated in FIG. 7, the synchronization control device 2 can control the synchronization of the two shafts well, just like the synchronization control device 1. Further, the digital filters used for the phase adjustors 21 and the delay time compensators 12 in the synchronization control device 2 are low-pass filters, of which the required arithmetic operation amount is lower than the notch filters. Therefore, according to the synchronization control device 2, the synchronization of the two shafts can be controlled well with less arithmetic operation amount than that of the synchronization control device 1.

Embodiment 3

Figure 8:
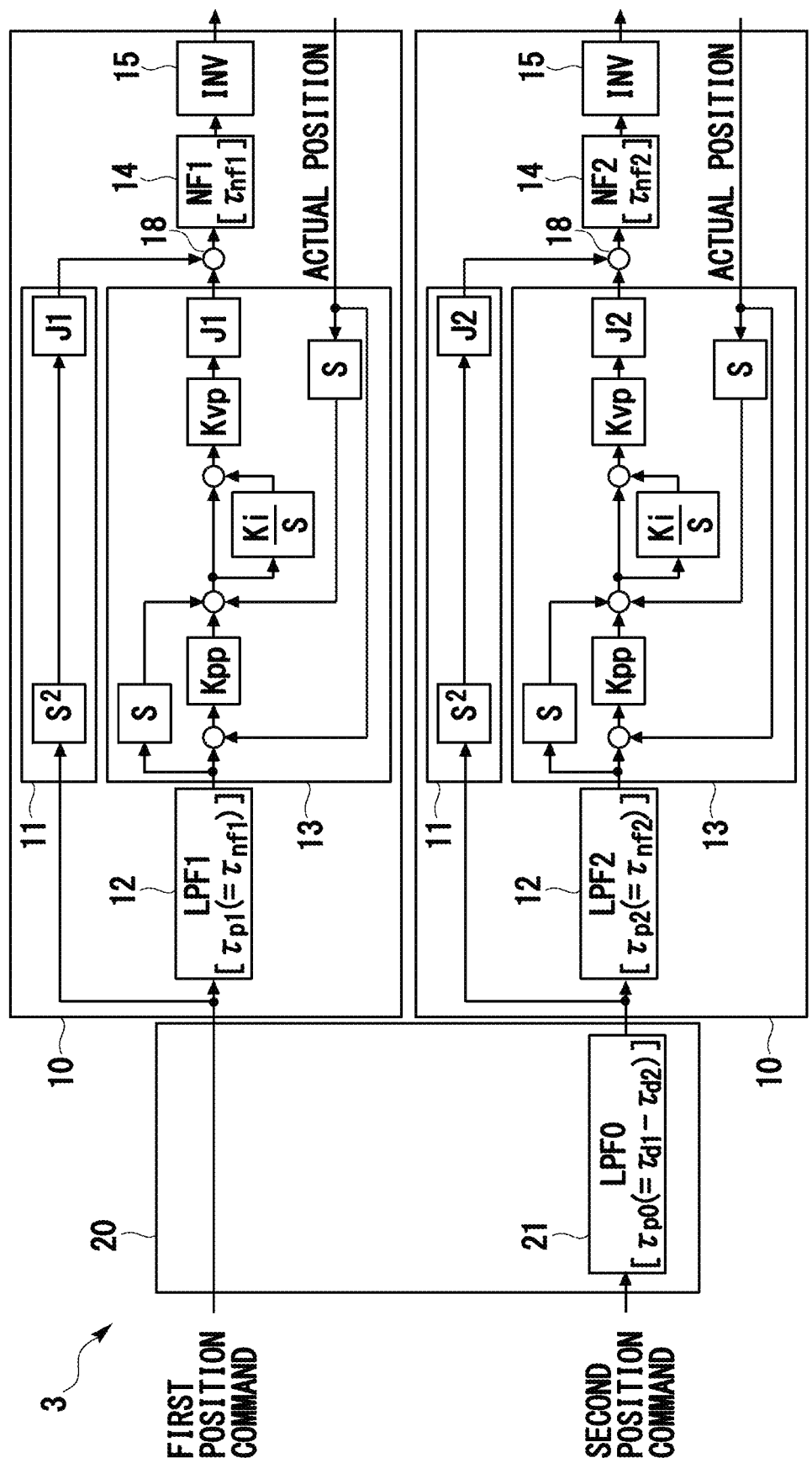
FIG. 8 is a schematic block diagram depicting a synchronization control device according to Embodiment 3 of the present invention.

FIG. 8 indicates a general configuration of a synchronization control device 3 according to Embodiment 3 of the present invention.

As the comparison between FIG. 8 and FIG. 6 indicates, the synchronization control device 3 according to Embodiment 3 is a device where only the configuration of the phase adjustment unit 20 is different from the synchronization control device 2 (FIG. 6)

In concrete terms, the phase adjustment unit 20 of the synchronization control device 3 is constituted of the second phase adjustor 21 alone, which adjusts the phase of the second position command. For this second phase adjustor 21, a low-pass filter LPF0, of which equivalent time constant $\tau_{p0}$ matches the "equivalent time constant $\tau_{d1}$ of the first delay time compensator 12—the equivalent time constant $\tau_{da2}$ of the second delay time compensator 12" is used. The first delay time compensator 12 and the second delay time compensator 12 according to Embodiment 3 are low-pass filter LPF1 and low-pass filter LPF2 respectively. In the case of the synchronization control device 3, $\tau_{p0}=\tau_{p1}-\tau_{p2}$, and $\tau_{p0}=\tau_{nf2}-\tau_{nf2}$ are also established.

When the phase adjustment unit 20 has the above configuration, the total of the equivalent time constants of the filters (first delay time compensator 12), through which the first position command passes before reaching the first FB torque command generation unit 13, is $\tau_{d1}$. The total of the equivalent time constants of the filters (second phase adjustor 21, second delay time compensator 12), through which the second position command passes before reaching the second FB torque command generation unit 13, is $\tau_{d1}-\tau_{d2}+\tau_{d2}=\tau_{d1}$.

In other words, in the case of the phase adjustment unit 20 having the above configuration as well, the total of the equivalent time constants of the filters, through which the first position command passes before reaching the first FB torque command generation unit 13, matches with the total of the equivalent time constants of the filters, through which the second position command passes before reaching the second FB torque command generation unit 13. Further, according to the phase adjustment unit 20 having the above configuration, the time difference between the time until the first position command is output from the first delay time compensator 12 and the time until the second position command is output from the second delay time compensator 12 can be decreased without delaying the phase of the first position command.

Figure 9:
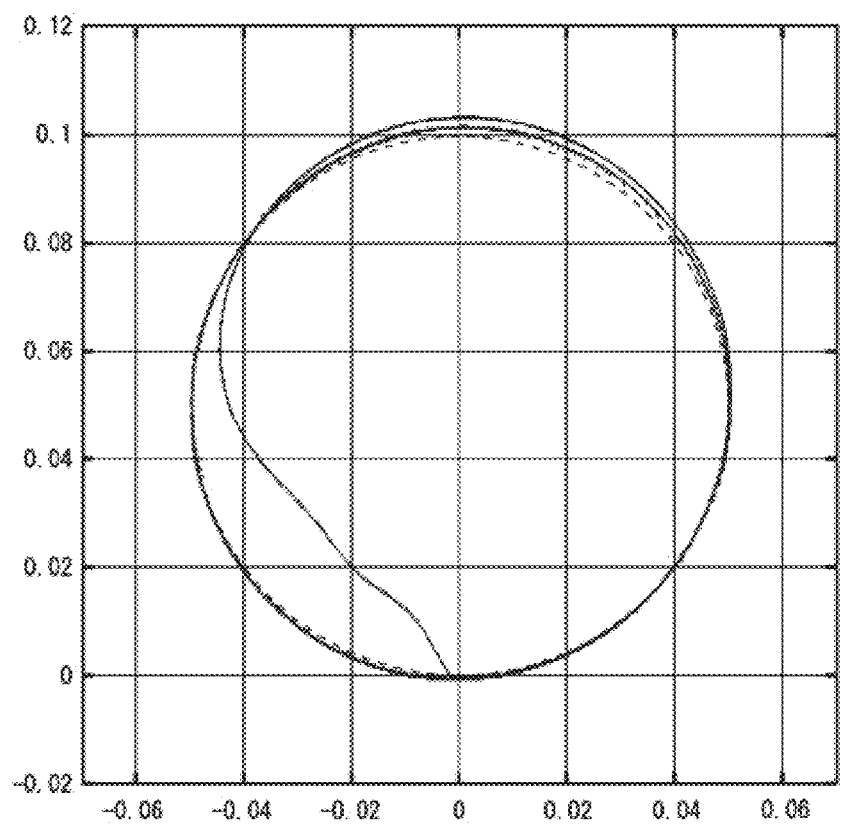
FIG. 9 is a diagram depicting an actual track that is acquired using the synchronization control device according to Embodiment 3.

Therefore according to the synchronization control device 3, the two shafts can be controlled with better track followability than the synchronization control device 2, as indicated in FIG. 9. The actual track in FIG. 9 is an actual track acquired by simulation that is performed under the same simulation conditions of the actual track in FIG. 5C and FIG. 7, and is indicated by magnifying an error from the target track (dotted line) 50 times.

Embodiment 4

Figure 10:
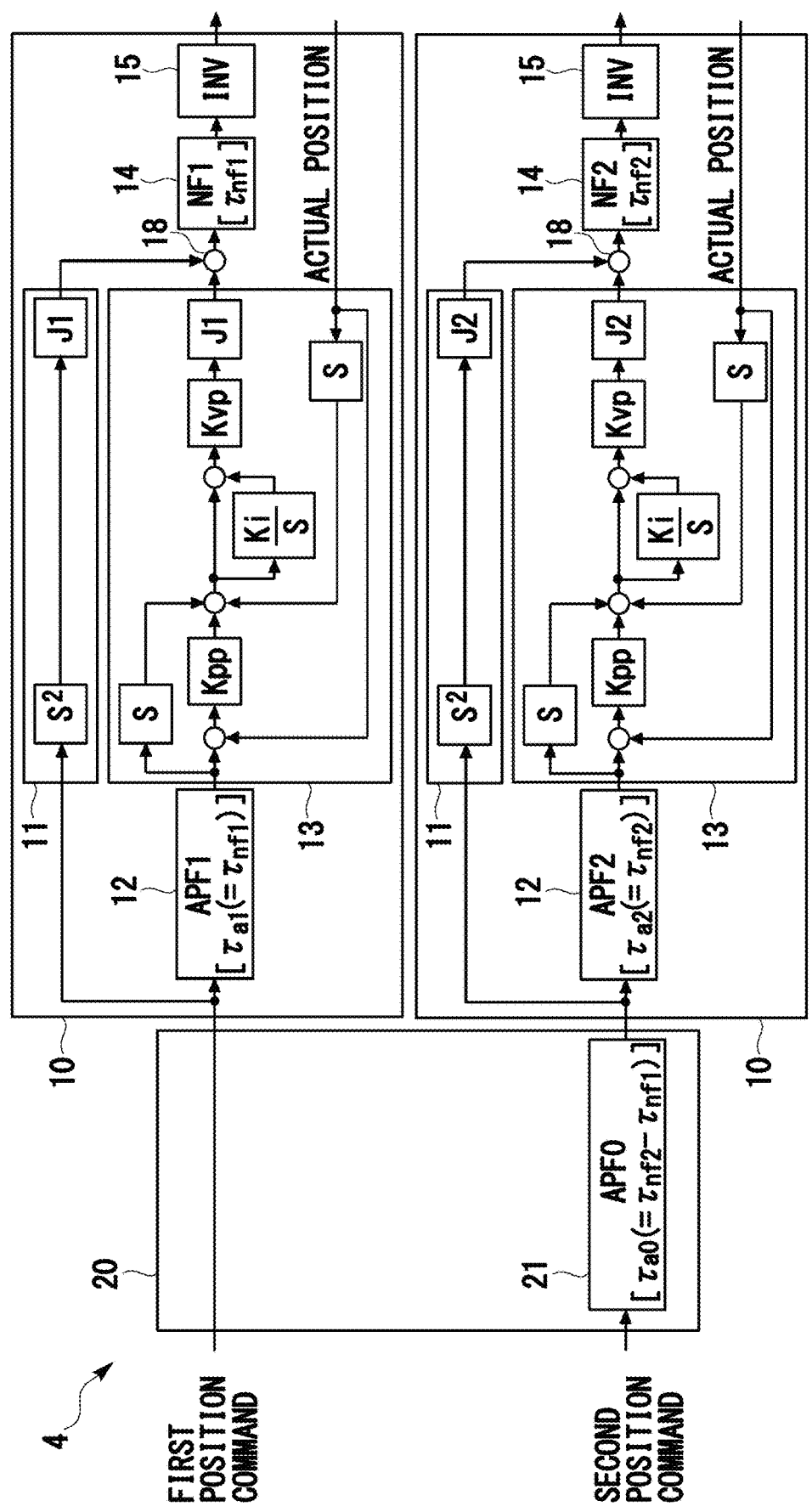
FIG. 10 is a schematic block diagram depicting a synchronization control device according to Embodiment 4 of the present invention.

FIG. 10 indicates a general configuration of a synchronization control device 4 according to Embodiment 4 of the present invention.

The synchronization control device 4 according to Embodiment 4 is a device where each low-pass filter of the synchronization control device 3 (FIG. 8) is replaced with an all-pass filter.

In concrete terms, in the synchronization control device 4, an all-pass filter APF1, of which equivalent time constant $\tau_{a1}$ matches with the equivalent time constant $\tau_{nf1}$ of the notch filter NF1 used for the first gain compensator 14, is used for the first delay time compensator 12. Further, in the synchronization control device 4, an all-pass filter APF2, of which equivalent time constant $\tau_{a2}$ matches with the equivalent time constant $\tau_{nf2}$ of the notch filter NF2 used for the second gain compensator 14, is used for the second delay time compensator 12.

The phase adjustment unit 20 of the synchronization control device 4 does not include the first phase adjustor 21, and includes for a second phase adjustor 21 an all-pass filter APF0, of which equivalent time constant Tao matches with "the equivalent time constant $\tau_{d1}$ (=$\tau_{a1}$) of the first delay time compensator 12—equivalent time constant $\tau_{d2}$ (=$\tau_{a2}$) of the second delay time compensator 12".

If the phase adjustor 21 or the delay time compensator 12 has a gain characteristic, the track reproducibility may drop because of this gain characteristic, but the synchronization control device 4 according to Embodiment 4 uses an all-pass filter which has no gain characteristic, for the phase adjustor 21 and the delay time compensator 12. Therefore, according to the synchronization control device 4, the mechanical system can be controlled with better track reproducibility than the above mentioned synchronization control devices 1 to 3, or the synchronization control devices 1 to 3 where all-pass filters are used for part of the phase adjustor 21 and the delay time compensator 12.

Figure 11A:
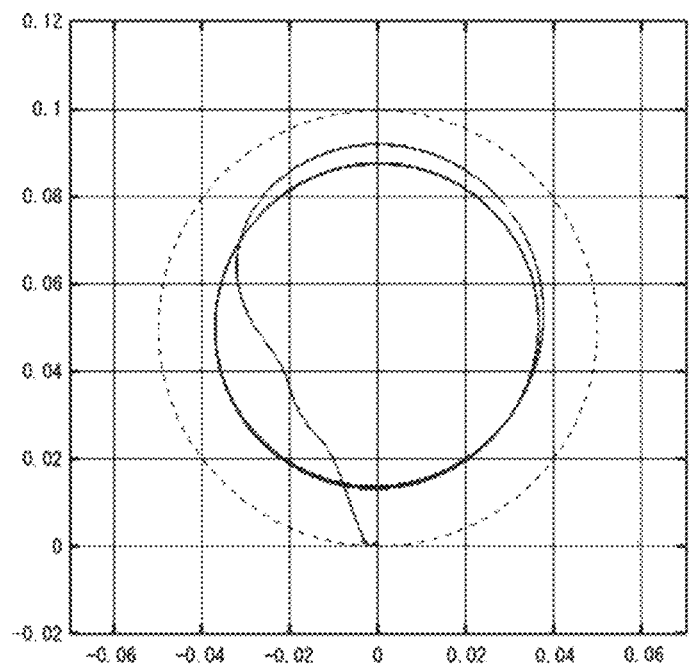
FIG. 11A is a diagram depicting an actual track that is acquired when phase is adjusted by APF, and delay time is adjusted by LPF.
Figure 11B:
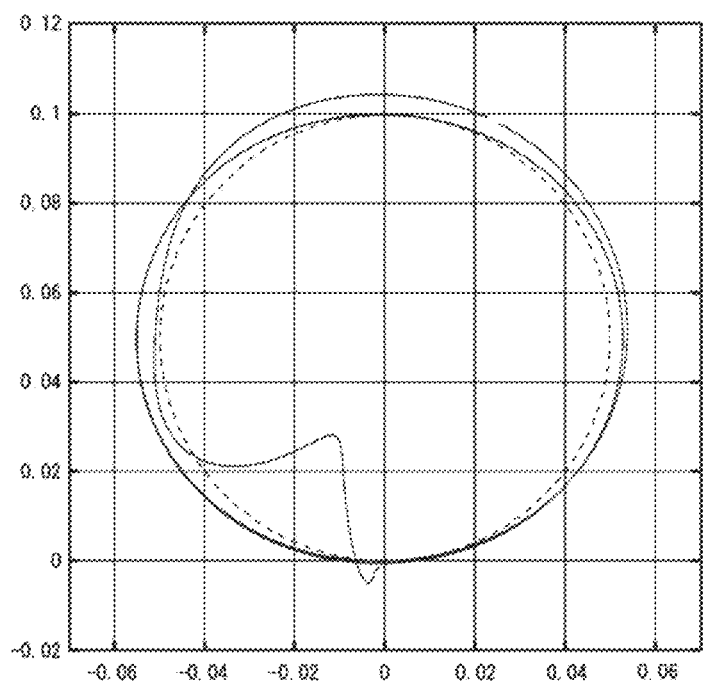
FIG. 11B is a diagram depicting an actual track that is acquired using the synchronization control device according to Embodiment 4.

As a concrete example, FIG. 11A indicates a simulation result of an actual track in the case of the synchronization control device 4, where each delay time compensator 12 is replaced with a low-pass filter. FIG. 11B indicates a simulation result of an actual track in the case of the synchronization control device 4. Each simulation result (actual track) in FIG. 11A and FIG. 11B is indicated by magnifying an error from the target track (dotted line) 50 times. Each simulation result is a simulation result when circular motion is 13 [cycle/s] which is faster than the simulations of FIG. 7 and the like. The transfer function $APF_m$ of the $APF_m$ (m=1 to 3) used for each simulation is as follows.

$$APF_m = \frac{-\frac{\tau_{am}}{2}s + 1}{\frac{\tau_{am}}{2}s + 1}$$ [Math. 3]

<Modification>

The above mentioned synchronization control device of each embodiment may be modified in various ways. For example, the synchronization control device of each embodiment may be modified as a device that controls three or more shafts. In order to modify the synchronization control device as a device that controls P (≥3) shafts, the control unit 10 having the above configuration is added to the synchronization control devices 1 to 4 for P-2 to P shafts, and instead of the above mentioned phase adjustment unit 20 for two shafts, a phase adjustment unit that can make "the equivalent time constant of the phase adjustor 21+the equivalent time constant of the delay time compensator 12" to be approximately the same for all shafts, is used, for example.

In the synchronization control device of each embodiment, a phase adjustment unit 20, that performs the phase advance compensation instead of the phase delay compensation, may be used. The phase adjustment unit 20 of the synchronization control device may be disposed on the side of the host device (e.g. a programmable logic controller (PLC)), which outputs a position command.

<Addition>

To compare the configuration requirements of the present invention and the configuration of each embodiment, the configuration requirements of the invention according to Claim 1 will be stated herein below with the reference signs used in the drawings.

[Claim1]

A synchronization control device that controls a first motor (30) and a second motor (30), comprising:

an adjustment unit (20) where a first position command that is a position command for the first motor (30), and a second position command that is a position command for the second motor (30) are to be input, and at least one of a phase of the first position command which were input and a phase of the second position command which were input is adjusted;

a first feed forward (FF) torque command generation unit (11) that generates a first FF torque command on the basis of the first position command which is input via the adjustment unit (20);

a first delay time compensator (12) that filters the first position command which is input via the adjustment unit (20);

a first feed back (FB) torque command generation unit (13) that generates a first FB torque command on the basis of the first position command which passed through the first delay time compensator (12), and a measurement result of an index value of a position of the first motor (30) or a position of a mechanical load (35) driven by the first motor (30);

a first gain compensator (14) that filters a first torque command acquired by adding the first FF torque command and the first FB torque command;

a first motor control unit (15) that controls the first motor (30) in accordance with the first torque command which passed through the first gain compensator (14);

a second FF torque command generation unit (11) that generates a second FF torque command on the basis of the second position command which is input via the adjustment unit (20);

a second delay time compensator (12) that filters the second position command which is input via the adjustment unit (20);

a second FB torque command generation unit (13) that generates a second FB torque command on the basis of the second position command which passed through the second delay time compensator (12), and a measurement result of an index value of a position of the second motor (30) or a position of a mechanical load (35) driven by the second motor (30);

a second gain compensator (14) that filters a second torque command acquired by adding the second FF torque command and the second FB torque command; and a second motor control unit (15) that controls the second motor (30) in accordance with the second torque command which passed through the second gain compensator (14), wherein the first delay time compensator (12) has an equivalent time constant which is in accordance with an equivalent time constant of the first gain compensator (14), the second delay time compensator (12) has an equivalent time constant which is in accordance with an equivalent time constant of the second gain compensator (14), and the adjustment unit (20) adjusts at least one of the phase of the first position command and the phase of the second position command such that the difference between a time until the input first position command is output from the first delay time compensator (12), and a time until the input second position command is output from the second delay time compensator (12) becomes smaller.

REFERENCE SIGNS LIST 1, 2, 3, 4 Synchronous control device
10, 50 Control unit
11 FF torque command generation unit
12 Delay time compensator
13 FB torque command generation unit
14 Gain compensator
15 Invertor unit
18 Adder
20 Phase adjustment unit
21 Phase adjustor
22 Detection unit
30 Motor
31 Position detector
35 Load

The invention claimed is:

1. A synchronization control device that controls a first motor and a second motor, comprising:
   an adjustment unit where a first position command that is a position command for the first motor, and a second position command that is a position command for the second motor are to be input, and at least one of a phase of the first position command which were input and a phase of the second position command which were input is adjusted;
   a first feed forward (FF) torque command generation unit that generates a first FF torque command on the basis of the first position command which is input via the adjustment unit;
   a first delay time compensator that filters the first position command which is input via the adjustment unit;
   a first feed back (FB) torque command generation unit that generates a first FB torque command on the basis of the first position command which passed through the first delay time compensator, and a measurement result of an index value of a position of the first motor or a position of a mechanical load driven by the first motor;
   a first gain compensator that filters a first torque command acquired by adding the first FF torque command and the first FB torque command;
   a first motor control unit that controls the first motor in accordance with the first torque command which passed through the first gain compensator;

a second FF torque command generation unit that generates a second FF torque command on the basis of the second position command which is input via the adjustment unit;

a second delay time compensator that filters the second position command which is input via the adjustment unit;

a second FB torque command generation unit that generates a second FB torque command on the basis of the second position command which passed through the second delay time compensator, and a measurement result of an index value of a position of the second motor or a position of a mechanical load driven by the second motor;

a second gain compensator that filters a second torque command acquired by adding the second FF torque command and the second FB torque command; and a second motor control unit that controls the second motor in accordance with the second torque command which passed through the second gain compensator, wherein the first delay time compensator has an equivalent time constant which is in accordance with an equivalent time constant of the first gain compensator, the second delay time compensator has an equivalent time constant which is in accordance with an equivalent time constant of the second gain compensator, and the adjustment unit adjusts at least one of the phase of the first position command and the phase of the second position command such that the difference between a time until the input first position command is output from the first delay time compensator and a time until the input second position command is output from the second delay time compensator becomes smaller.

2. The synchronization control device according to claim 1, wherein the first delay time compensator has an equivalent time constant that is the same as the equivalent time constant of the first gain compensator, and the second delay time compensator has an equivalent time constant that is the same as the equivalent time constant of the second gain compensator.

3. The synchronization control device according to claim 1, wherein the adjustment unit adjusts at least one of the phase of the first position command and the phase of the second position command such that the difference between a time until the input first position command is output from the first delay time compensator and a time until the input second position command is output from the second delay time compensator becomes "0".

4. The synchronization control device according to claim 1, wherein the equivalent time constant of the second delay time compensator is larger than the equivalent time constant of the first delay time compensator, and the adjustment unit adjusts the phase of the second position command without adjusting the phase of the first position command.

5. The synchronization control device according to claim 4, wherein the adjustment unit is an all-pass filter that adjusts the phase of the second position command.

6. The synchronization control device according to claim 1, wherein the adjustment unit includes a first all-pass filter which adjusts the phase of the first position command, and a second all-pass filter which adjusts the phase of the second position command.

7. The synchronization control device according to claim 1, wherein the first delay time compensator is a low-pass filter or an all-pass filter, and the second delay time compensator is a low-pass filter or an all-pass filter.

\* \* \* \* \*